Jan. 7, 1969  T. R. CASTILLO ET AL  3,420,475
PILOT'S CHAIR FOR COMBAT AIRCRAFT
Filed Sept. 6, 1966  Sheet 1 of 2

INVENTORS
TOMAS R. CASTILLO
FRED M. ROBERTS
BY
Frank D. Preger
ATTORNEY

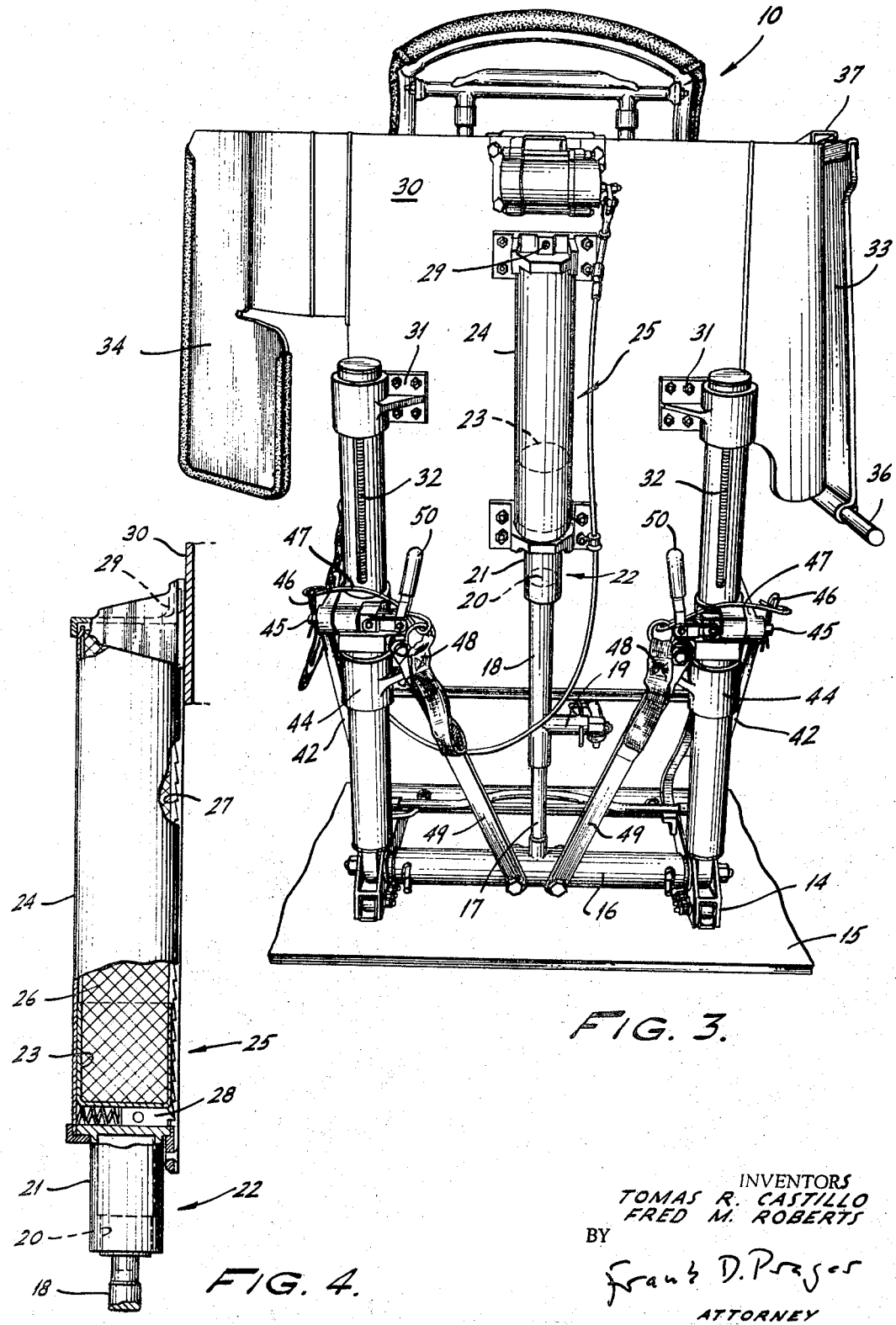

United States Patent Office 3,420,475
Patented Jan. 7, 1969

3,420,475
PILOT'S CHAIR FOR COMBAT AIRCRAFT
Tomas R. Castillo, Garden Grove, and Fred M. Roberts, Dana Point, Calif., assignors to Philco-Ford Corporation, a corporation of Delaware
Filed Sept. 6, 1966, Ser. No. 577,379
U.S. Cl. 244—122         5 Claims
Int. Cl. B64d 25/06; B60r 21/10

ABSTRACT OF THE DISCLOSURE

This invention relates to a chair for use in military aircraft, and particularly to a chair which is armored, in order to protect the pilot or other occupant from gunfire. A unitary, impact and vibration absorbing structure is provided. It is specially, although not exclusively, adapted to utilization in combat helicopters, which often make very hard landings, sometimes deliberately.

---

Figures 1, 2:
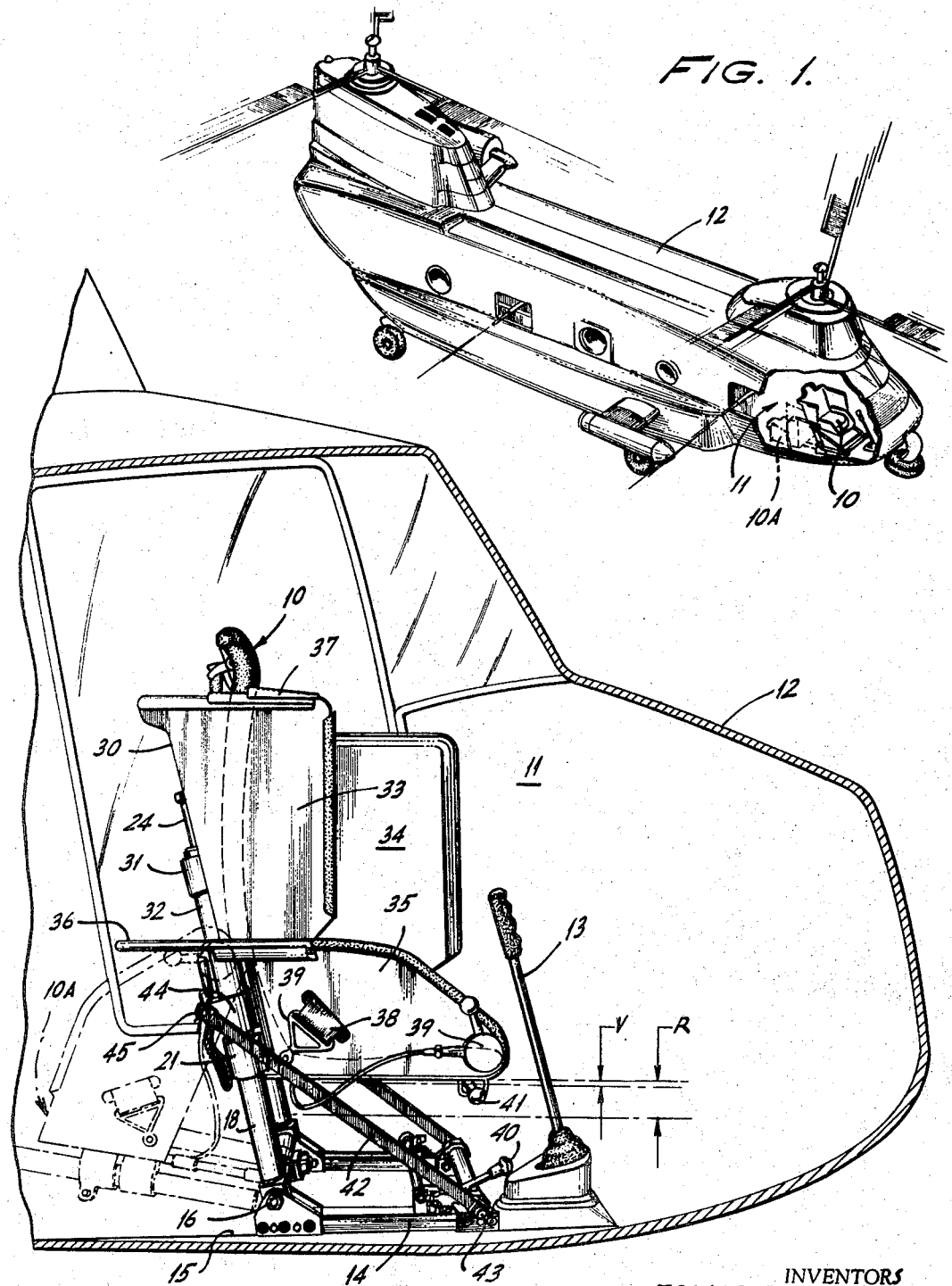

The new and improved pilot's chair, in addition to its use of steel armor, has a novel suspension system which advantageously affords the following features: substantial isolation of the pilot from aircraft vibration; improvement of survival rate in crash landings and minimization of back injuries in hard landings, through the provision of apparatus capable of absorbing impact energy at a controlled rate, with negligible rebound; and provision of a seat-reclining feature by means of which a wounded occupant may readily be placed in a prone position to facilitate removal from the aircraft and minimize physiological shock.

The advantages of the new suspension system will be understood when it is considered that often in normal flight of such aircraft, the mass of the armored pilot's chair tends to vibrate and thereby to cause fatigue or sicknesses. Additionally, upon a hard landing, structure-deforming impacts are likely to be delivered to the framework. At such times deflection of the armor becomes a severe hazard, even apart from the direct, vertical shock sustained by the occupant. Still further, when it becomes necessary during flight to apply first aid to a wounded pilot and for this purpose to recline the chair, required manipulations have been difficult or sometimes impossible, due to the weight of the armored chair. Also, when removed from their anchoring joints some of the armored chairs used in the past tended to shift around dangerously in the cockpit. All of these problems are overcome by the invention.

The new structure will be described more fully with reference to the drawing, wherein FIGURE 1 is a perspective side and front view of a helicopter equipped with the new armored seat, and FIGURE 2 is a perspective side view taken on a larger scale, in vertical longitudinal section through the front portion of the helicopter adjacent the pilot's seat area. FIGURE 3 is a perspective rear view of the new chair, and FIGURE 4 is a sectional detail view, drawn to a larger scale showing a portion of the apparatus illustrated in FIGURE 3.

As indicated in FIGURES 1 and 2, chair 10 is normally mounted in upright position in cockpit 11 of helicopter 12, behind control stick 13. As will be understood, there may be several such chairs, in various locations. Support rails 14, running parallel to the main axis of the aircraft are attached to floor 15 of the cockpit. Incorporated in these rails is a strong pivot pin 16 which is disposed, as shown, below a lower rear portion of the chair. This pin has a generally horizontal axis and extends transversely across the floor.

In accordance with the invention, and as further shown in FIGURE 3, this pivot structure supports an upright rod or rack 17, directly behind chair 10 and its armor. An outer cylinder 18 surrounds and is adjustably secured to this rod by a pin structure 19 of known construction. Coaxially secured to the upper end of the cylinder is a piston 20. This piston is slidably inserted in cylinder 21 of a vibration-absorbing unit 22, and the top of the latter cylinder, in turn, has a piston 23 rigidly and coaxially secured thereto and slidably inserted in cylinder 24 of an impact absorber 25 filled with crushable material, for example the "honeycomb" 26 (FIGURE 4).

In order to allow for absorption of strong and possibly repeated impacts, the body of crushable material 26 and cylinder 24 surrounding it are preferably made relatively long so that they occupy a major portion of the height of chair 10, while the cylinder of vibration absorber 22, therebelow can be relatively short. Any sliding motions of impact absorber cylinder 24, relative to its piston, occur along a common upright axis of cylinders 24, 21 and 18 and are transmitted to the pilot's chair as will be noted presently. These motions are controlled by a ratchet-toothed rack 27 forming part of this cylinder. The rack cooperates with a pawl device 28 on piston 23 to allow downward motion of cyinder 24 upon a landing impact, but to prevent upward rebound of this cylinder relative to piston 23 and the structure supporting it.

It will be seen that generally rigid structure is provided by helicopter floor 15, rails 14, pivot pin 16, rod 17, cylinder 18, and piston 20, but that in response to airframe vibrations, cylinder 21 of vibration absorber 22 moves up and down along piston 20 in small oscillatory motions, suitably damped by means including the resiliently compressible medium in this cylinder. The normal extent of such vibratory motions is indicated in FIGURE 2 at V. Vibrating cylinder 21 is normally held in rigid connection with the superposed and chair-supporting cylinder 24 by crushable material 26, but exceptionally, in case of a hard landing, this cylinder 24 performs downward, honeycomb-crushing motion, relative to its piston 23, for instance to the extent indicated at R. In this way the two piston and cylinder units have been arranged in mechanically interconnected and mutually superposed positions but have been made functionally independent of one another, using one for normal vibration control throughout normal flight, while using the other for impact control in case of hard landings.

Upper cylinder 24 is secured by support brackets 29 to back armor 30 of pilot's chair 10. Brackets 31 secure this armor to spring support or suspension means 32, which normally support the weight of seat 10 and of the occupant and the armor surrounding him. Two coil springs are shown, and as indicated by the drawing they advantageously are dsposed along generally upright axes, parallel to the axis of vibration and impact absorber 18, 22, 25 (FIGURES 3 and 4) and disposed on both sides thereof. It will further be noted that the chair armor includes side panels 33, 34, 35 (FIGURE 2), some of which are slidable in suitable guides 36, 37 to facilitate access to the seat. The basic seat structure is completed by safety strap structure 38 and means 39 for the tightening and release thereof.

In operation the pilot initially adjusts the seat assembly to place it in proper position, for example in proper relationship with control stick 13. For this purpose he raises a handle 40, FIGURE 2, thereby allowing longitudinal sliding of the seat assembly on rails 14, and thereafter lowers the handle to lock the seat in proper position, as is well known in the automotive art. In order to adjust the height of his seat he operates a handle 41 which by intermediate linkage, not shown, controls pin assembly 19 (FIGURE 3) and momentarily disconnects vertical rod 17 from surrounding cylinder 18 so that the chair assembly—suspended on spring units 32—can be adjusted upwards and downwards.

During normal flight, as already indicated, the seat assembly is suspended on spring units 32. Normal vibrations of the assembly, represented at V in FIGURE 2 are damped by means including piston and cylinder unit 22 (FIGURE 3). In case of hard or crash landings, major impact is absorbed by the progressive crushing of honeycomb material 26 in cylinder 24, FIGURE 4. Rebound of such material is prevented by ratchet device 27, 28.

Should it become necessary to apply first aid to the pilot, and for this purpose to recline the seat from position 10 (FIGURE 1) to position 10-A, the invention facilitates this operation, while insuring the vibration and impact control described above. For this purpose the new construction provides special means for partial disassembly of the seat positioning structure. Care must be taken to insure quick disassembly of the strong and massive positioning structure which normally holds the seat in upright position during flight and withstands the vibrations of the air frame. A preferred structure for this purpose includes diagonal braces 42, FIGURE 2, one on each side of the armored chair and each of which is permanently, pivotally connected to a rail 14, by a pivot 43, while being releasably anchored to a rigid bracket 44 on spring suspension device 32 by pin and fastener means 45. Any person in, or having access to the aircraft can release the pin and fastener means by first removing fasteners 46, for which purpose flexible wire structure 47 is attached to said fasteners, this wire structure in turn being manually operable by a flexible strap 48, the far end of which is attached to rigid brace structure 49. When the pin fasteners have been removed, pins 45 are withdrawn by swiveling pin operating handles 50. The upper ends of side braces 42 are then unsupported and the braces, held only by pivots 43, then drop into horizontal position. The chair is then free to be reclined into position 10-A (FIGURE 1). Of course it will be understood that a variety of fasteners as well as fastener releasing devices can be utilized and that structure 42 to 50 has been shown for purposes of illustration and not limitation.

While only a single embodiment of the invention has been described, the details of such embodiment are not to be construed as limitative of the invention.

We claim:

1. A unitary structure for association with an aircraft chair and effective to absorb aircraft vibrations, as well as impacts which may be encountered during hard or crash landings, said unitary structure comprising: a cylinder mounted behind the chair, substantially parallel to the back of the chair and vertically co-extensive with at least a substantial portion of the height of the chair; a second and shorter cylinder structure disposed below the other cylinder and coaxially connected to the lower end thereof; means disposed and adapted for movement in said second and shorter cylinder structure to absorb said vibrations; means on said second cylinder structure constructed and arranged to move into the other cylinder upon any of said impacts and to transmit the same; and crushable material within the other cylinder, substantially filling it and effective to absorb any impact transmitted by said means, said other cylinder further having means for preventing rebound of said crushable material following initial impact.

2. A structure as described in claim 1 additionally including at least one resilient structure such as a coil spring generally parallel to the axis of said cylinders, for supporting the chair.

3. Chair structure for combat aircraft, comprising: a chair; armor connected to said chair structure to protect the occupant from gunfire; and mounting means to mount the armored chair in the combat aircraft, said means comprising a crushable, one-way operable impact absorber extending in upright position, vertically coextensive with a major portion of the height of said armor, and disposed adjacent the back thereof for preventing dangers arising from deflection of the armor due to impact on crash landings of the aircraft, and a vibration absorber disposed below said impact absorber and connected thereto behind said chair and armor.

4. Structure as described in claim 3, including resilient means for supporting the chair, subject to motions relative to said vibration absorber means and impact absorber means, the impact and vibration absorber means and the resilient supporting means being disposed along parallel, generally upright axes behind and adjacent the armored chair.

5. Structure as described in claim 3, additionally including generally horizontal pivot means disposed below a lower rear portion of the mounting means for mounting the chair in the aircraft; braces on both sides of the chair, each pivoted to the aircraft below a lower front portion of the chair; and fasteners between free ends of the braces and the mounting means, for firmly holding the chair in the upright position.

References Cited

UNITED STATES PATENTS

| | | |
|---|---|---|
| 2,401,748 | 6/1946 | Dillon. |
| 2,724,463 | 11/1955 | Becker. |
| 2,971,566 | 2/1961 | Negroni _____ 244—122 X |
| 2,981,317 | 4/1961 | Cartwright _____ 244—122 X |
| 3,000,020 | 9/1961 | Lombard et al. ____ 244—122 X |
| 3,059,966 | 10/1962 | Spielman. |
| 3,335,982 | 8/1967 | Stahl. |

MILTON BUCHLER, *Primary Examiner.*

RICHARD A. DORNON, *Assistant Examiner.*

U.S. Cl. X.R.

244—138; 297—216; 188—1